US008942404B1

(12) United States Patent
Serota

(10) Patent No.: US 8,942,404 B1
(45) Date of Patent: Jan. 27, 2015

(54) HEADSET WITH RETINAL DISPLAY AND INTEGRATED COMPUTING SYSTEM

(71) Applicant: Virtual Goggles Inc., Oswego, IL (US)

(72) Inventor: Lee Serota, Oswego, IL (US)

( * ) Notice: Subject to any disclaimer, the term of this patent is extended or adjusted under 35 U.S.C. 154(b) by 0 days.

(21) Appl. No.: 14/480,395

(22) Filed: Sep. 8, 2014

Related U.S. Application Data

(63) Continuation of application No. PCT/US2013/025784, filed on Feb. 12, 2013.

(60) Provisional application No. 61/906,914, filed on Nov. 21, 2013.

(51) Int. Cl.
*H04R 25/00* (2006.01)
*H04R 1/10* (2006.01)
*G02B 27/01* (2006.01)
*G09G 5/00* (2006.01)
*H04M 1/00* (2006.01)

(52) U.S. Cl.
CPC ............ *H04R 1/105* (2013.01); *G02B 27/0176* (2013.01)
USPC .............................. 381/379; 345/8; 455/575.2

(58) Field of Classification Search
USPC ........... 381/370–379, 74, 383, 367; D14/205, D14/204; 379/430; 455/575.2; 345/8
See application file for complete search history.

(56) References Cited

U.S. PATENT DOCUMENTS

| 8,577,427 | B2 | 11/2013 | Serota | |
|---|---|---|---|---|
| 2002/0190923 | A1* | 12/2002 | Ronzani et al. | 345/50 |
| 2011/0273365 | A1* | 11/2011 | West et al. | 345/8 |
| 2012/0050144 | A1* | 3/2012 | Morlock | 345/8 |

* cited by examiner

*Primary Examiner* — Curtis Kuntz
*Assistant Examiner* — Sunita Joshi

(57) ABSTRACT

The adjustable headset is an all in one device that includes an adjustable support band, a display system, a first and second ear cover, a computer system, a communications system, and a power source. The adjustable support band connects to each ear cover, with the ear covers being adjacent to a user's ears. The display system uses image projecting devices that use optics to refract images from through image refocusing devices and focus the projected image on a retina. The display system is attached to the ear covers by adjustable screen bars, which allow a user to change the general orientation of the display system. The computer system is capable of storing and running software programs and interfacing with connected devices by means of a set of connection ports or the communications system. The virtual goggles can adjust to meet individual comfort needs and interface with a variety of technologies.

20 Claims, 10 Drawing Sheets

HEADSET WITH RETINAL DISPLAY AND INTEGRATED COMPUTING SYSTEM

The current application is a 371 of international PCT Application Number PCT/US13/25784 filed on Feb. 12, 2013 and claims benefit of U.S. Provisional Patent Application No. 61/906,914 filed Nov. 21, 2013.

FIELD OF THE INVENTION

The present invention relates generally to a headset which projects an image onto a user's retina to create a Heads-Up Display.

BACKGROUND OF THE INVENTION

There are currently many devices, including headgear, which incorporate computer functionality. These devices take many forms, from helmets to goggles and glasses, essentially providing users with portable, lightweight, and convenient systems. Others provide enhanced viewing experience for multimedia, whether playing games or watching movies. However, while current products provide specific features, many of them are narrow in focus. Some current solutions are meant purely for movies and video, lacking the capability to be used for productivity. Some devices are capable of playing games, but only in the sense that they connect to a dedicated console; the devices themselves only serve as displays and are incapable of independently running and displaying games. There are even some solutions which are very narrow in scope, being integrated into medical devices or helmets, displaying video from a camera or providing wireless communication methods, such as radio. They are only capable of limited functions, or restricted in regards to the devices they can interact with. It is therefore an object of the present invention to provide a computerized headgear which is capable of connecting to a variety of devices, as well as providing multimedia, computing, and accessory functions. It is a further object of the present invention to serve as an all-in-one device capable of serving as an entertainment platform, office tool, and more.

The present invention combines basic computer capabilities with an advanced display and multimedia environment. Numerous connection methods and tertiary features are included to ensure the present invention is a useful product regardless of the situation and location users may find themselves.

DETAIL DESCRIPTIONS OF THE INVENTION

All illustrations of the drawings are for the purpose of describing selected versions of the present invention and are not intended to limit the scope of the present invention.

Figure 1:
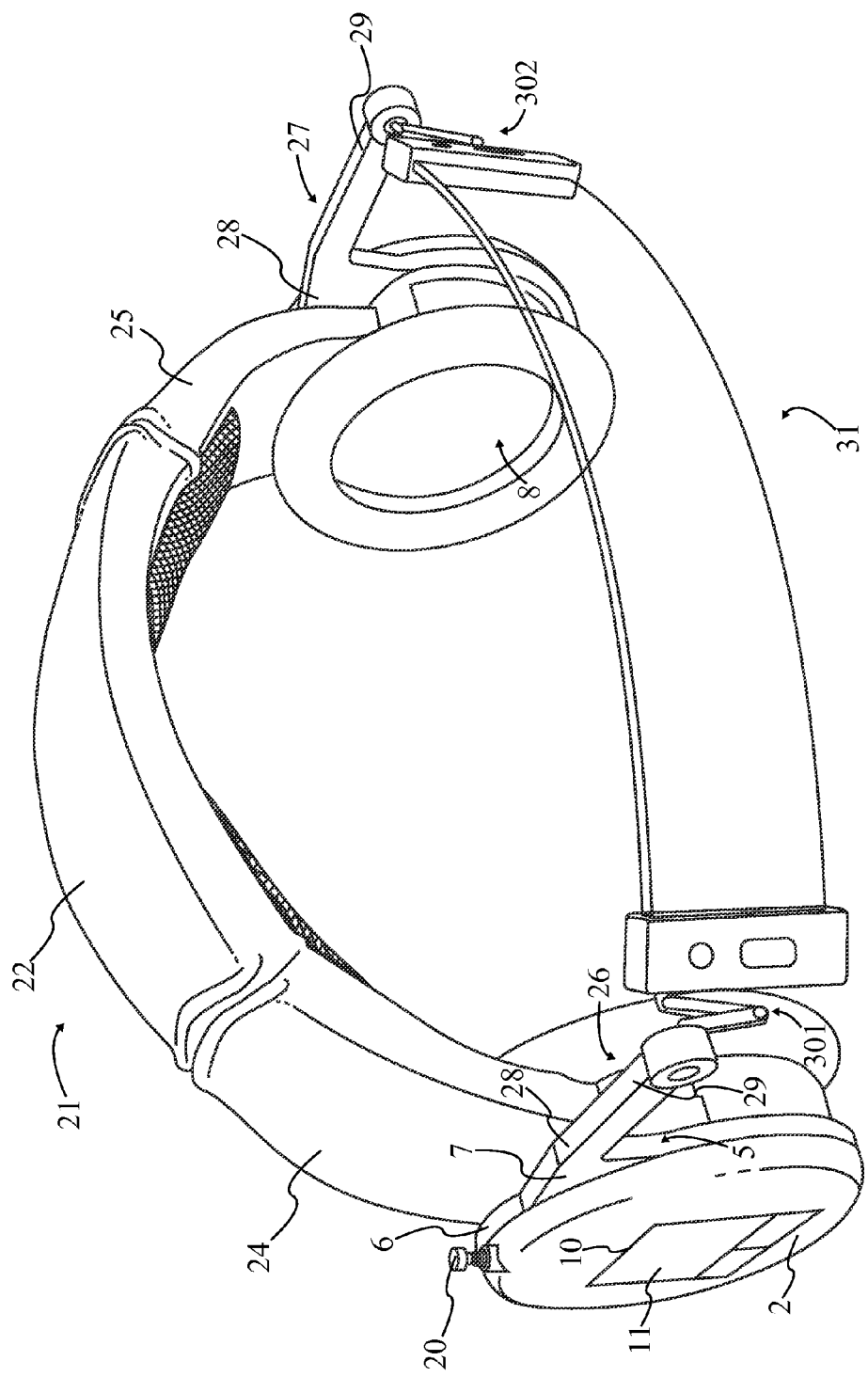
FIG. 1 is a perspective view of the present invention.
Figure 2:
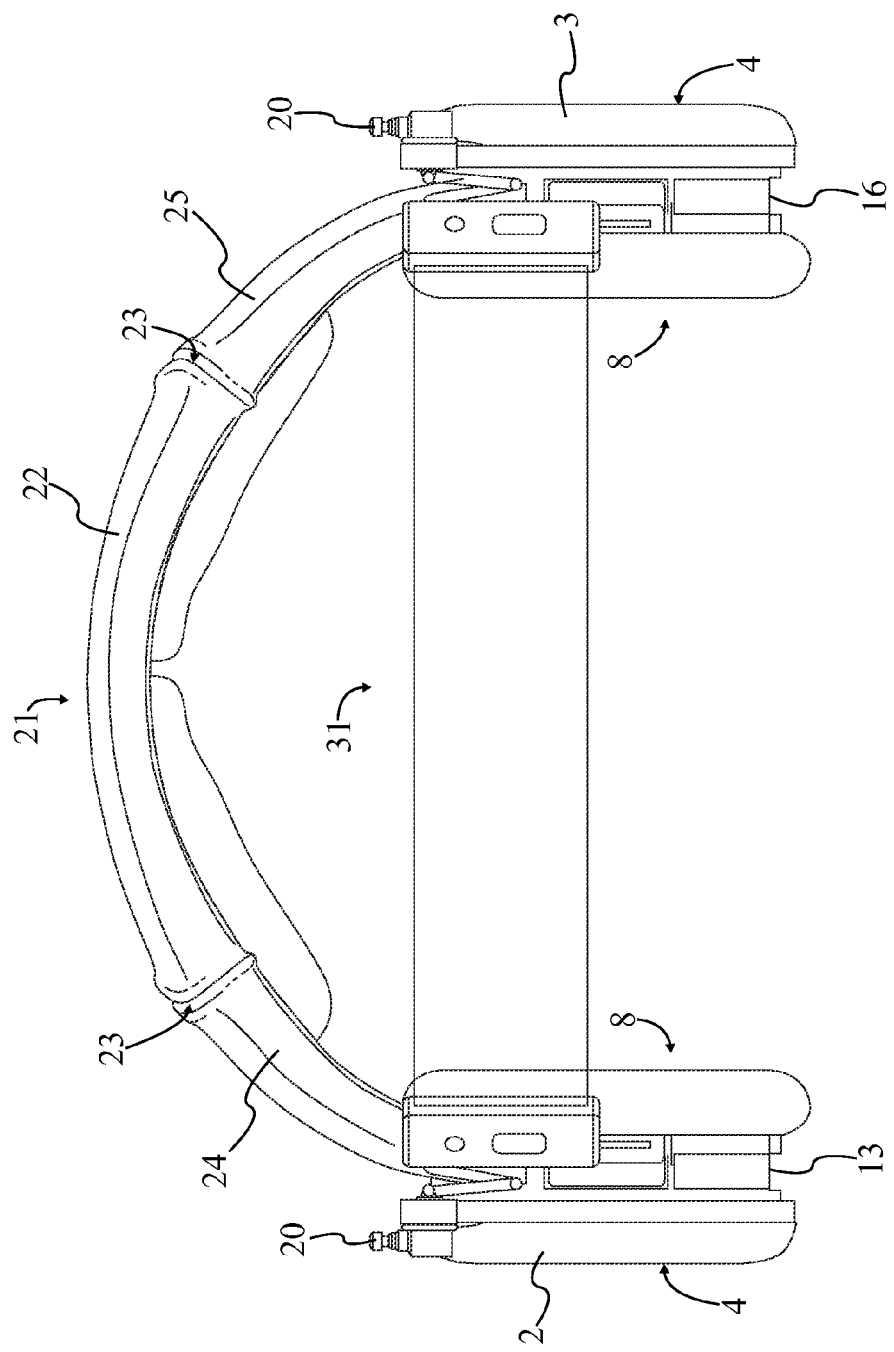
FIG. 2 is a front view of the perspective invention.
Figure 3:
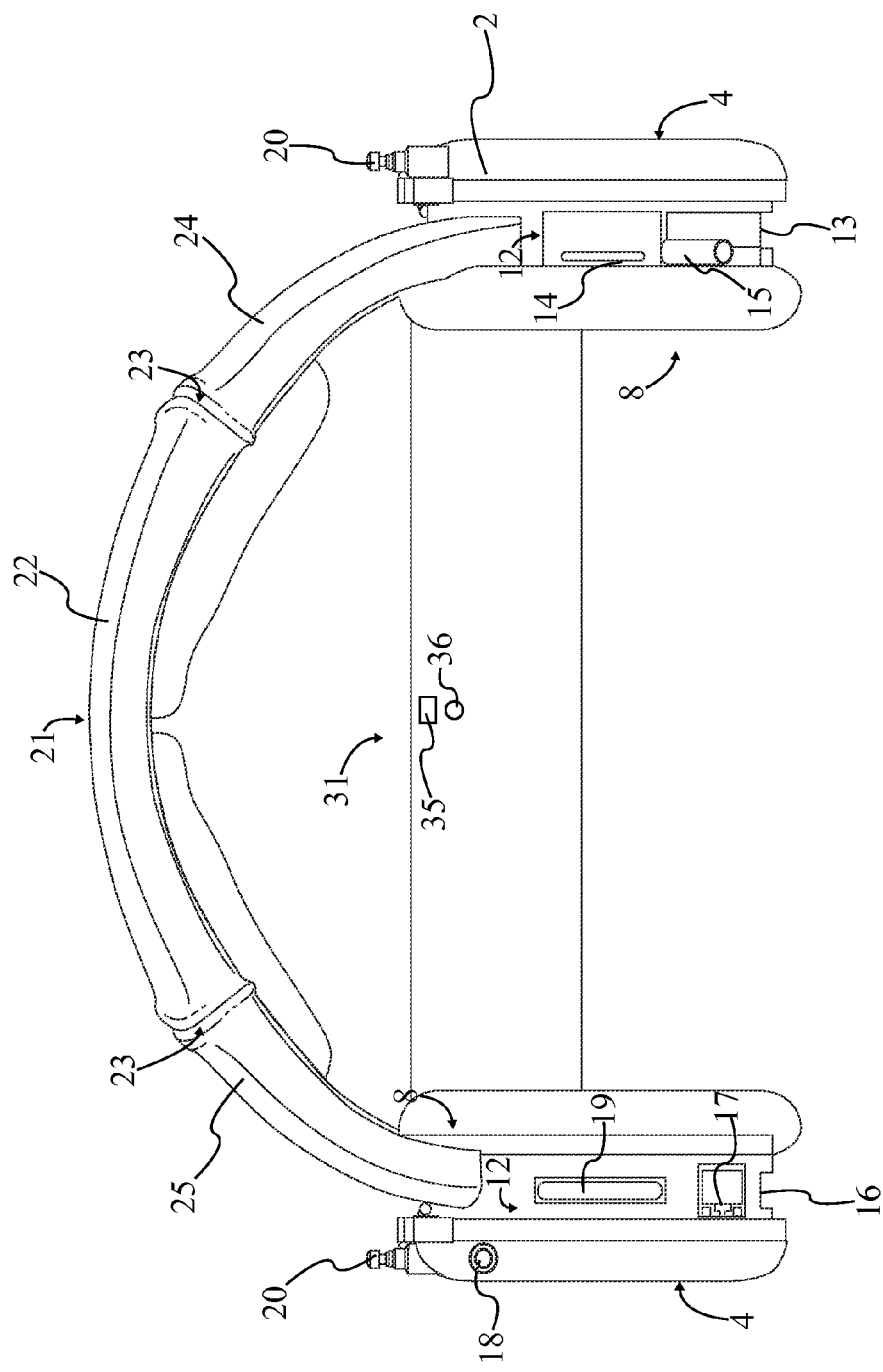
FIG. 3 is a rear view of the present invention.
Figure 4:
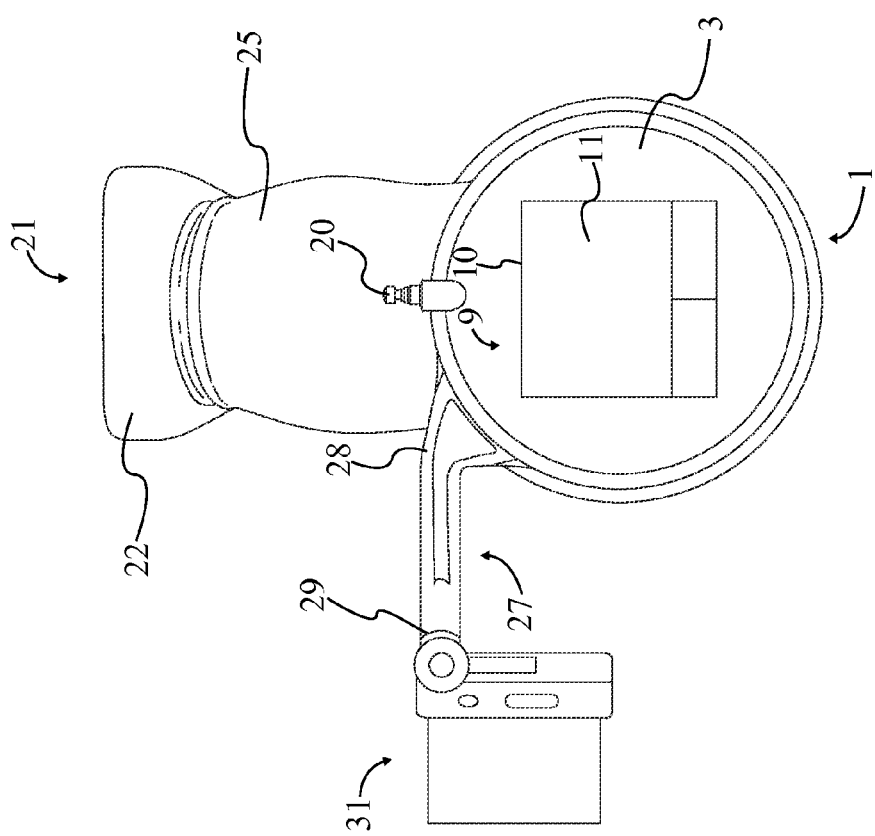
FIG. 4 is a right view of the present invention.
Figure 5:
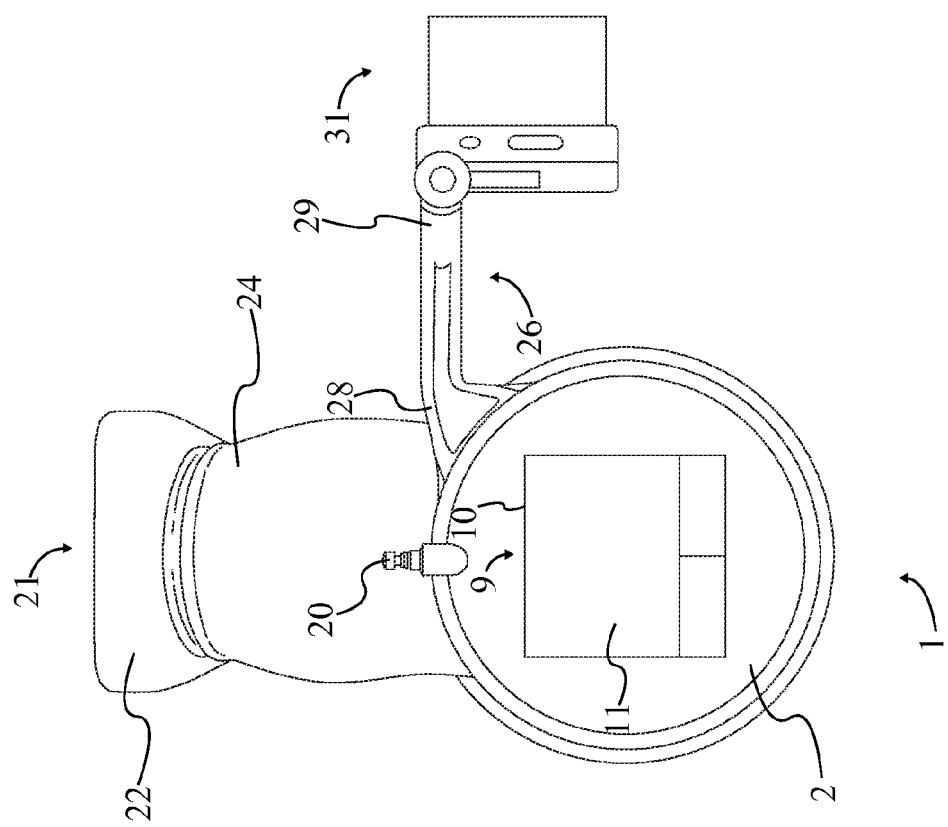
FIG. 5 is a left view of the present invention.
Figure 6:
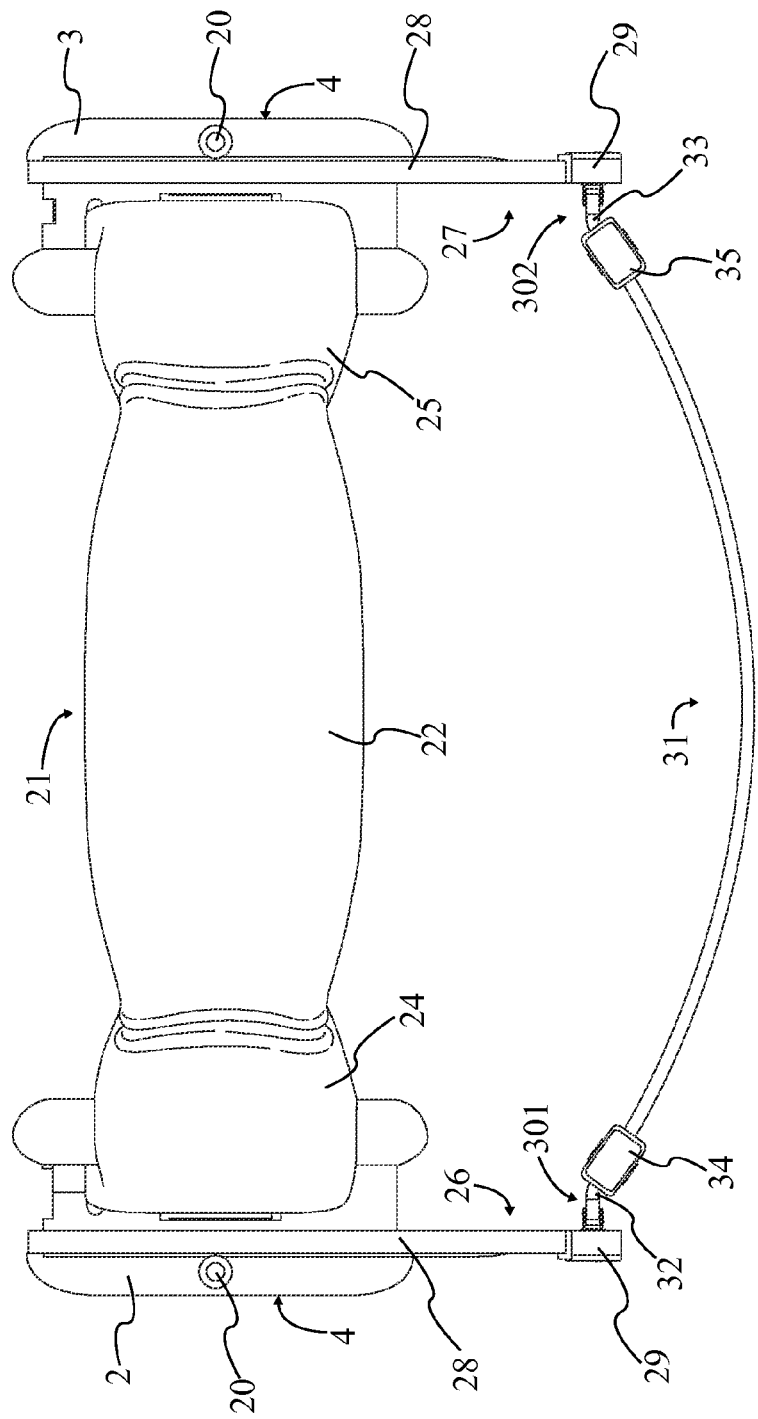
FIG. 6 is a top view of the present invention.
Figure 7:
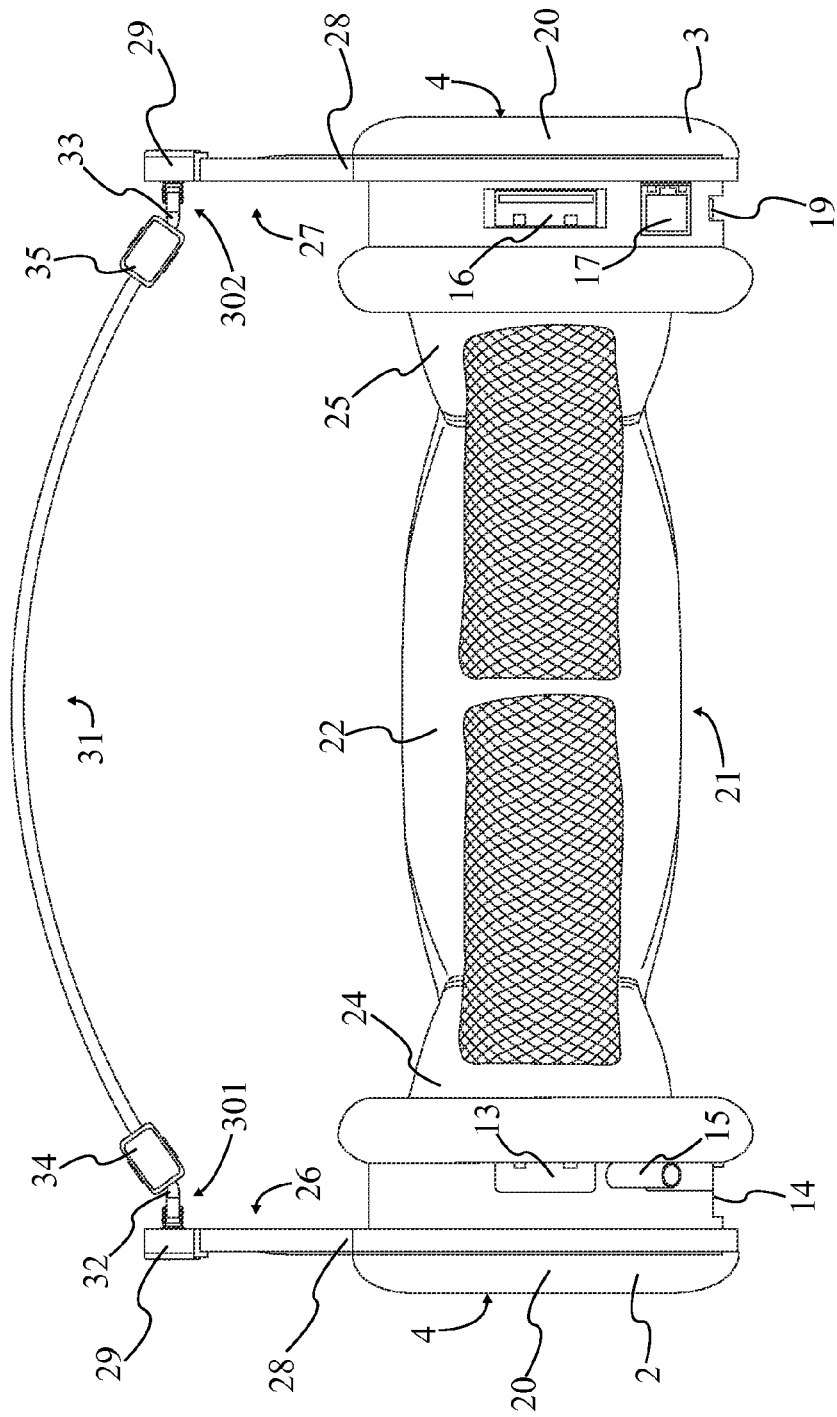
FIG. 7 is a bottom view of the present invention.
Figure 8:
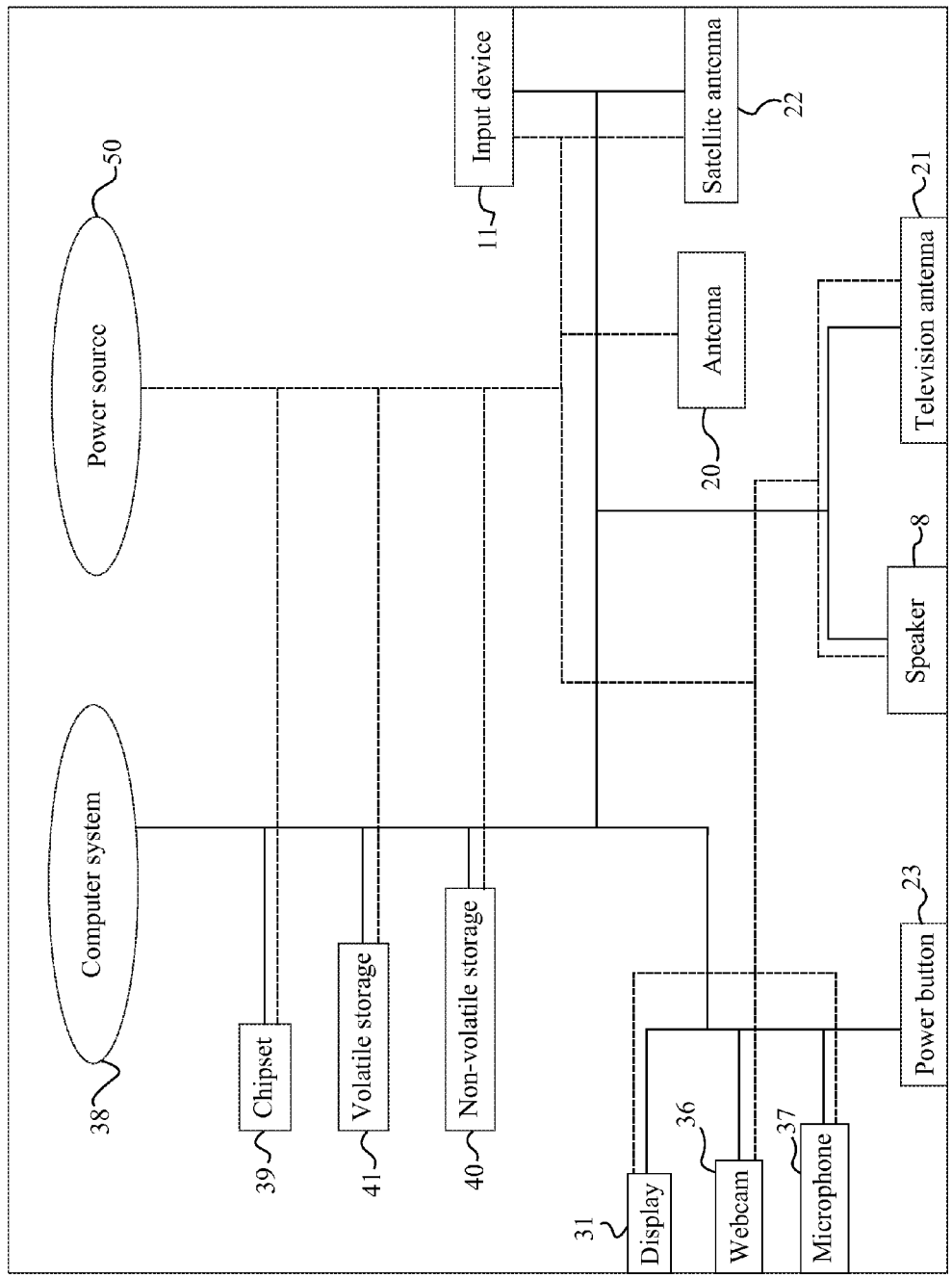
FIG. 8 is a graphic showing electrical and electronic connections of the present invention.
Figure 9:
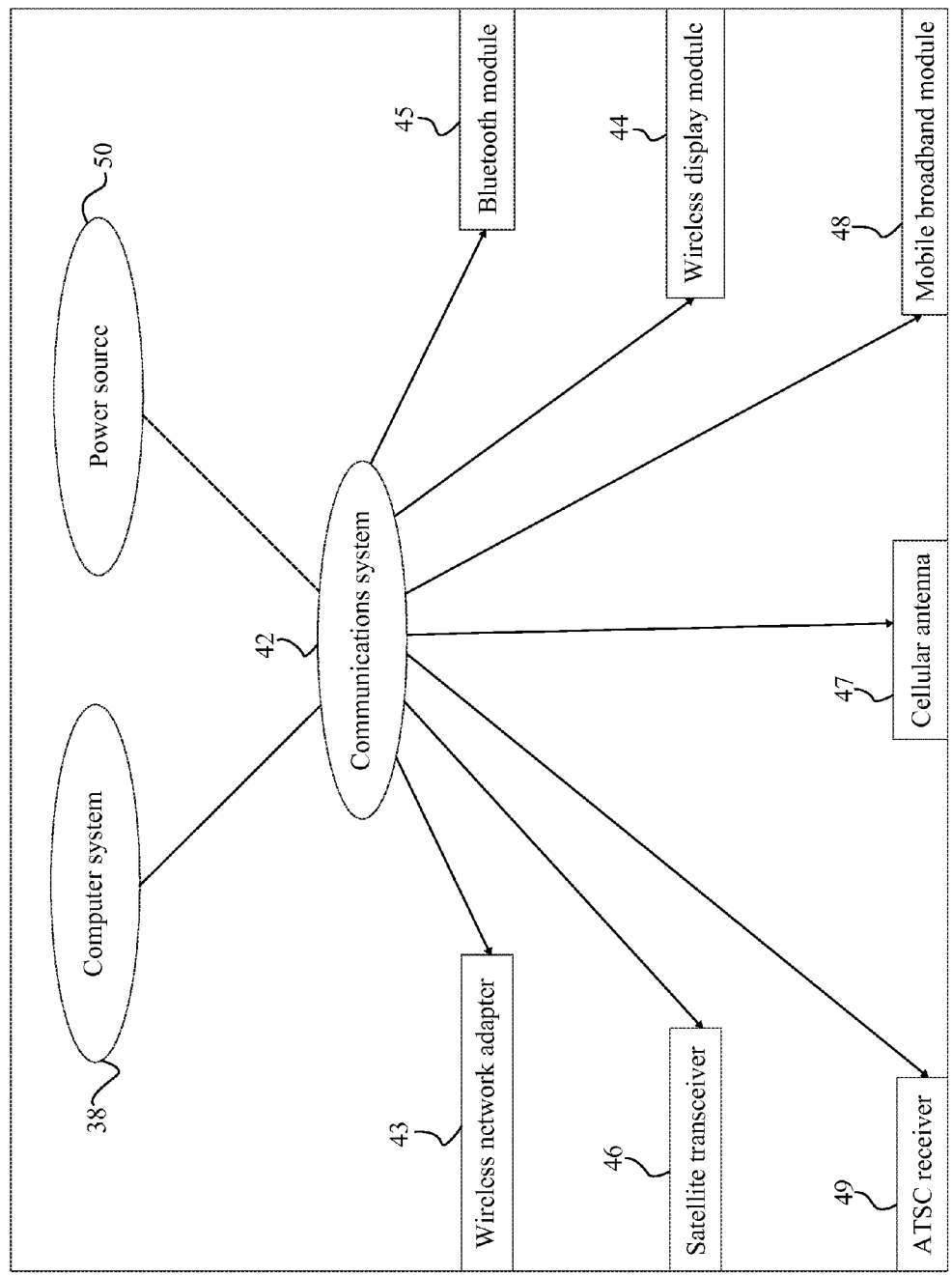
FIG. 9 is another graphic showing electrical and electronic connections of the present invention.
Figure 10:
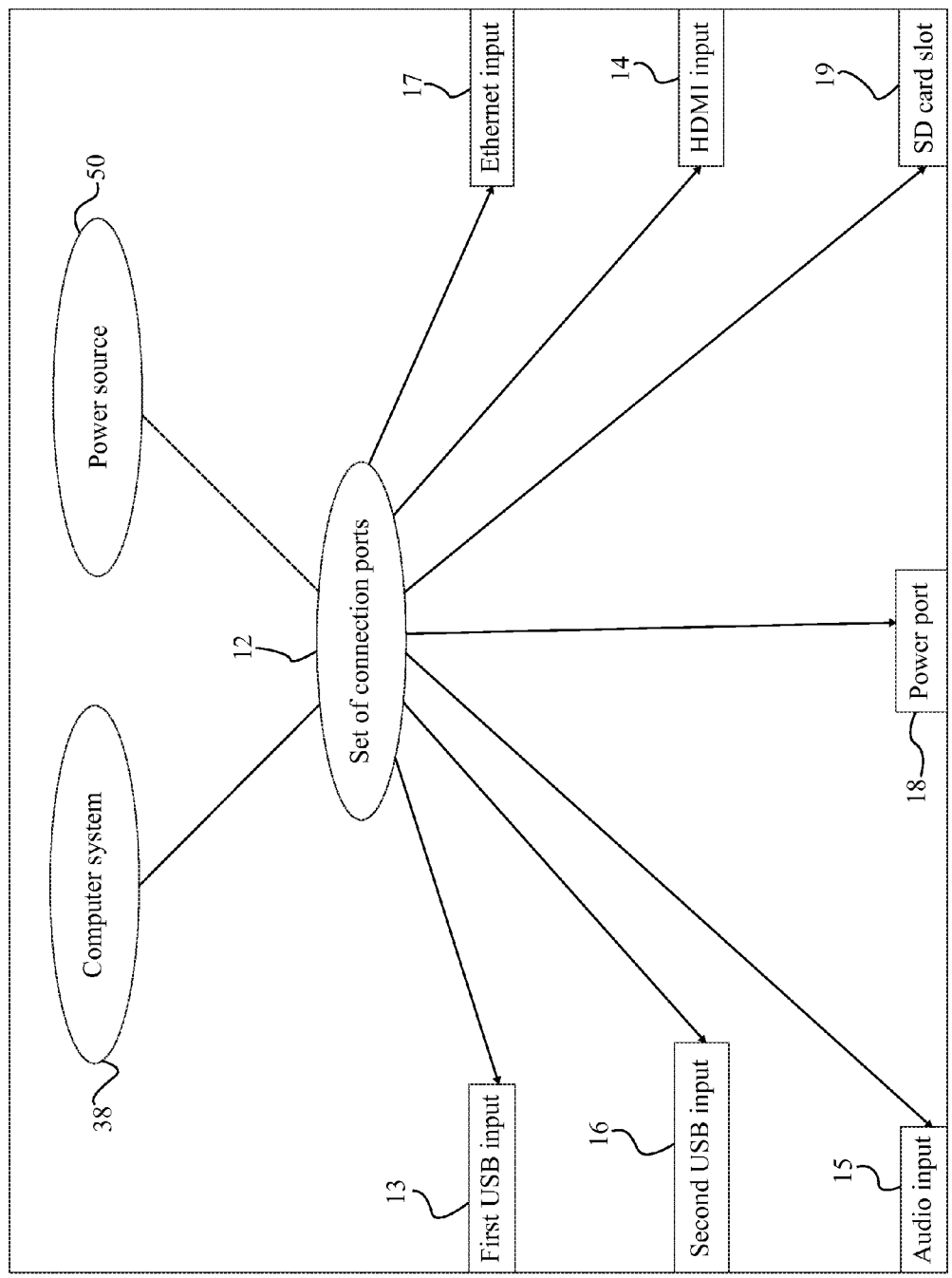
FIG. 10 is another graphic showing electrical and electronic connections of the present invention.

The present invention is a computerized display system 31 built into headgear. The present invention comprises a pair of ear covers 1, an expandable support band 21, a first screen bar 26, a second screen bar 27, a display system 31, a computer system 38, a communications system 42, and a power source 50. The expandable support band 21 connects the first ear cover 2 and the second ear cover 3, allowing the expandable support band 21 to rest atop a user's head while the first ear cover 2 and second ear cover 3 rest against a user's ears. The first screen bar 26 is connected to the first ear cover 2, while the second screen bar 27 is connected to the second ear cover 3. The first screen bar 26 and second screen bar 27 are extendable. In addition, the first screen bar 26 and the second screen bar 27 can be rotated in relation to the first ear cover 2 and second ear cover 3. The display system 31 is connected to the first screen bar 26 and the second screen bar 27, such that movement of the first screen bar 26 and the second screen bar 27 results in corresponding movement of the display system 31. For example, the screen bars can extended or retracted to help adapt the present invention to individual variations in physical features. Similarly, rotation of the screen bars allows the display system 31 to be rotated out of a user's field of view, allowing them to still wear the present invention during ambulatory activities or while performing tasks which require visual attention. The computer system 38, communications system 42, and power source 50 are all contained with the present invention, with individual subcomponents housed within the first ear cover 2 or second ear cover 3. The power source 50 provides sufficient power to run the display system 31, computer system 38, and communications system 42, as well as any auxiliary devices included. The computer system 38 is connected to the display system 31 and communications system 42, allowing the computer system 38 to output a visual interface, as well as any relevant information, to the display system 31. A notable aspect of the present invention is the display system 31, which uses projection technology to create images directly on a user's retinas. As a result, the present invention introduces heads-up display (HUD) technology to the field of headgear-based computerized display systems. The present invention and its constituent components are illustrated via FIG. 1-FIG. 7. Electronic and electrical aspects are outlined in FIG. 8-FIG. 10.

The pair of ear covers 1 comprises a first ear cover 2 and a second ear cover 3. The first ear cover 2 and second ear cover 3 each comprise an enclosure 4, an annular screen rail 5, a speaker 8, a control interface 9, a set of connection ports 12, and an antenna 20. The enclosure 4 preferably has a cylindrical shape, being wide enough to cover an ear. The speaker 8 is located on an interior face of the enclosure 4, where it would be adjacent to a user's ear while the present invention is being worn. The speakers 8 also include a padding around the speaker 8 perimeter to cushion a user's ear against the ear covers and to increase user comfort. On an exterior face, opposite the speaker 8, is where the control interface 9 is positioned. The control interface 9 allows a user to interact with the present invention while wearing it, simply by using a free hand to send commands through the control interface 9. The control interface 9 comprises an input housing 10 and an input device 11. The input housing 10 is recessed into the enclosure 4 and holds the input device 11. The input device 11 is preferably a touchpad with mouse buttons, similar to that used with laptops. In addition, it is preferable that the input device 11 can be removed from the input housing 10 and used remotely, sending commands to the computer system 38 by means of the communications system 42. The annular screen rail 5 is positioned on the annular face of the enclosure 4 and comprises a track 6 and guide slider 7. The guide slider 7 is restrained to the track 6, but is free to move along the track 6. The guide slider 7 (of the first ear cover 2 and the second ear cover 3) serves as a connection point for the first screen bar 26 and second screen bar 27 (respectively), allowing the angle between the expandable support band 21 and the first screen bar 26 and second screen bar 27 to be adjusted. This allows a user to rotate the first screen bar 26 and second screen bar 27 such that the expandable support band 21 is either above or behind a user's head. The antenna 20 is rotatably connected to the enclosure 4, allowing it to be adjusted to provide better reception as necessary. Preferably, the antenna 20 is also telescoping, such that it may be extended to improve reception or retracted to increase the visual appeal of the current invention.

The set of connection ports 12 on the first ear cover 2 comprises a first Universal Serial Bus (USB) input 13, a High-Definition Multimedia Interface (HDMI) input 14, and an audio input 15. The set of connection ports 12 on the second ear cover 3 comprises a second USB input 16, an Ethernet input 17, a power port 18, and a Secure Digital (SD) card slot 19. Each set of connection ports 12 is powered by the power source 50 and in communication with the computer system 38, allowing the present invention to make use of external accessories like flash drives, printers, and external displays such as monitors. The antenna 20 of the first ear cover 2 is preferably a television antenna 20, allowing the present invention to receive television broadcasts, while the antenna 20 of the second ear cover 3 is preferably a satellite antenna 20 allowing the present invention to receive satellite signals. The enclosures 4 are protected by a waterproof coating, such as polyurea, to help prevent water from leaking into and damaging the electronic components.

In other embodiments the annular screen rail 5 could instead be connected to the expandable support band 21, resulting in the first screen bar 26 and second screen bar 27 being fixed while the expandable support band 21 can be rotated around the pair of ear covers 1. It is also possible for the speakers 8 to be positioned away from a user's ears, rather than adjacent to said ears. However, this would likely decrease user comfort and also allow other persons in proximity to hear sound from the speakers 8, reducing privacy of the user. Other possible alterations include allowing the first ear cover 2 and second ear cover 3 where they connect to the expandable support band 21. This would allow the first ear cover 2 and second ear cover 3 to rotate until they are flat, such that the speaker 8 could rest on a flat surface like a table. This would allow the ear covers to serve as stands for the present invention, letting a user interact with the present invention even while not wearing it.

The expandable support band 21 is worn on the head, supporting the present invention on a user's head as well as securing the first ear cover 2 to the second ear cover 3. The expandable support band 21 comprises a main section 23, a first end section 24, and a second end section 25. The main section 23 comprises a main rail 23, which is internal to the main section 23. The main rail 23 runs the length of the main section 23, protruding from a first end and second end of the main section 23. The main rail 23 inserts to the first end section 24 and second end section 25, connecting the first end section 24 to the first end of the main section 23. Similarly, the main rail 23 connects the second end section 25 to the second end of the main section 23. In this manner the first end section 24 and second end section 25 may be moved closer to or away from the main section 23, simply by sliding along the main rail 23. This allows a user to alter the length of the expandable support band 21 to better support their individual head size. The expandable support band 21 also helps to secure the other components of the present invention; the first ear cover 2 is attached to the first end section 24 opposite the main section 23 just as the second ear cover 3 is attached to the second end section 25 opposite the main section 23. The main section 23, first end section 24, and second end section 25 each include padding on a bottom surface. The padding serves as a soft layer between the expandable support band 21 and a user's head, increasing user comfort. The main section 23, first end section 24, and second end section 25 each also include a waterproof coating over an exterior upper surface. This waterproof coating can be made from a variety of materials, such as polyurea, and serves to repel water and help protect internal components, especially electrical components, from water damage. As discussed, this configuration of the expandable support band 21 allows a user to expand or contract portions of the present invention; in this manner the present invention is able to accommodate individual variations in head shape and width.

In other embodiments the expandable support band 21 may use an adjustment method other than the main rail 23 system. For example, the first end section 24 and second end section 25 could be connected to the main section 23 by a compressible material, similar to the bellows of an accordion. Another possible addition is the inclusion of intermediate sections. These intermediate sections could provide finer adjustments to the curve of the expandable support band 21. The first end section 24 and second end section 25 could also be rotatably attached to the first ear cover 2 and second ear cover 3, respectively, allowing the expandable support band 21 to rotate just as the screen is capably of rotating.

The first screen bar 26 and the second screen bar 27 each comprise a support end 28 and a screen end 29. The screen end 29 serves as an attachment point for the display system 31 and is capable of sliding into the support end 28. By sliding the screen end 29 into or out of the support end 28, a user can adjust the distance of the display system 31 in relation to their face. The display system 31 could be moved closer for watching multimedia or other applications where an immersive environment is desirable, while the display system 31 could be moved away for office work or similar situations, where it would be beneficial to be able to see papers on a desk by simply glancing down rather than having to remove or flip the display system 31. The support end 28 connects to the guide slide on the annular screen rail 5, allowing the first screen bar 26 and second screen bar 27 (and as a result, the display system 31 itself), to be move along the track 6. As the expandable support band 21 can be increased or decreased in width, the connection between the screen bars and the display system 31 must be flexible; a rigid connection would prevent a user from adjusting the expandable support band 21. Thus, the display system 31 is hingedly connected to the screen end 29 of the first screen bar 26 and correspondingly hingedly connected to the screen end 29 of the second screen bar 27. This connection is enabled by a first hinge 301 and second hinge 302, which join the display system 31 with the first screen bar 26 and second screen bar 27, respectively. This provides an element of flexibility that is important to the proper function of the expandable support band 21.

In other embodiments the first screen bar 26 and second screen bar 27 could include an auxiliary support to assist the adjustable support band. This auxiliary support could be applied in a variety of manners, such as a chin strap that is connected to the support end 28 of the first screen bar 26 and to the support end 28 of the second screen bar 27. A nose bridge could also be connected to the first screen bar 26 and second screen bar 27, acting in a similar manner as does the bridge in glasses, although care must be taken so that the bridge does not interfere with the view of a user. The first screen bar 26 and second screen bar 27 could include additions for purposes other than added support. A side cover, taking the form of removable plates or a simple curtain, could be attached to the first screen bar 26 and the second screen bar 27 rail. These covers would serve to reduce the amount of light reaching a user and improve the user's experience when watching movies or engaging in similarly immersive applications.

The display system 31 comprises a first image projection device 32, a second image projection device 33, a first image refocusing device 34, a second image refocusing device 35, a webcam 36, and a microphone 37. The first image projection device 32 and the first image refocusing device 34 are provided for outputting an first image on a user's first retina. Correspondingly, the second image projection device 33 and second image refocusing device 35 are provided for outputting a second image on a user's second retina. Image generation and focusing is made possible by having the first image projection device 32 be in optical communication with the first image refocusing device 34 and having the second image projection device 33 be in optical communication with the second image refocusing device 35. This in an improvement upon prior art which require the use of physical screens; by directing images directly onto a user's retina, the screen can be simplified or even omitted altogether. This significantly reduces the weight and bulk of the display system 31, which is a great advantage as the present invention is meant to be worn on a person's head. The image projection devices output optical rays that compose an image towards a respective image refocusing device. The image projection devices are functionally similar to projection devices used in commercial and home theaters, albeit scaled down to accommodate the size of the present invention. The image refocusing devices redirect and focus the optical rays, resulting in the rays converging on a desired point; more specifically, the rays are redirected towards a user's retina such that an image is output to said retina. The result is that a composite image is formed by projecting a first image and a second image onto a user's retinas. Because images are projected directly onto a user's retinas, a HUD effect is created; images effectively appear superimposed onto a user's regular vision.

The image projection devices preferably combine to create a "high definition" image, defined as at least 1920 pixels in width and 1080 pixels in height. The created image can emulate a large screen size, appearing to take up the entire field of view of a user, thus emulating theater and other large screen experiences. Additionally, the image projection devices are capable of applying three-dimensional technology to create the illusion of depth with projected images. The use of high definition images and three-dimensional images is not required, and the present invention can be implemented in a more basic form that utilizes lesser resolutions, effective screen sizes, and two-dimensional images.

The first image projection device 32 and the first image refocusing device 34 are mounted to the first screen bar 29, positioning them in proximity to a user's first eye. Similarly, the second image projection device 33 and the second image refocusing device 35 are mounted to the second screen bar 30, positioning them close to the second retina onto which they output an image. Potentially, the image projection devices and image refocusing devices can instead be installed in a transparent screen, with the transparent screen being rotatably connected between the first screen bar and the second screen bar. The transparent screen can also serve as an protective barrier, similar to goggles, for a user. Also possible is the utilization of a polarized transparent screen, useful for helping to reduce glare during use of the present invention. In an embodiment that utilizes the transparent screen, the said screen is hingedly connected to the first screen bar 26 and the second screen bar 27 by a corresponding first hinge 301 and second hinge 302. This allows adjustments to be made to the width of the adjustable support band without being restricted by the transparent screen; connected hinges allow the adjustable support band to expand with respect to the transparent screen.

The webcam 36 and microphone 37 provide a user with additional means of interaction, allowing video and audio to be captured and transmitted to other parties. The webcam 36 and microphone 37 can be positioned adjacent to on one of the two screen bars, or instead centered on the transparent screen (in embodiments that comprise the transparent screen). Preferably, the webcam 36 and microphone 37 are recessed into their surrounding features such that they help provide a cleaner aesthetic nature for the present invention. This positioning also helps to reduce bulk of the display system 31. Expanding upon the electrical connection of the display system 31 with the power source 50, the power source 50 is electrically connected to the first image projection device 32, second image projection device 33, webcam 36, and microphone 37. Similarly, to allow communication with other components of the present invention, the display system 31 and its first image projection device 32, second image projection device 33, webcam 36, and microphone 37 are each electronically connected to the computer system 38.

In another embodiment, the display system can potentially be made to be removable, allowing it to be replaced with a separate consumer device, though this would likely require a device specific adapter to ensure compatibility between the large number of aftermarket devices and the present invention. The adapter ideally affords the added device the same movement capabilities as the stock display system 31, as well as allows the added device to make use of the computer system 38 and communications system 42 of the present invention, or simply using those available in the added device if that is preferred, and assuming the device is capable.

The computer system 38 comprises a chipset 39, a non-volatile storage 40, and a volatile storage 41. The chipset 39 can run instructions, allowing the present invention to utilize software and operating systems. The non-volatile storage 40 allows the present invention to install an operating system and software programs. The volatile storage 41 allows the present invention to use programs at faster speeds. In the preferred embodiment, the non-volatile storage 40 will utilize NAND flash while the volatile storage 41 will use random access memory, preferably DDR3 SDRAM. In combination, these three components allow the present invention to effectively run an operating system (such as Android™) and other programs. The computer system 38 is in communication with all other electronic devices of the system, including the communications system 42, set of inputs, display system 31, and antennas 20. This allows the computer system 38 to interact with all other components as well as output information, such as a visual interface, to the screen. The computer system 38 is preferably housed with either the first ear cover 2 or the second ear cover 3, although it could also be split across both if desired.

In other embodiments the computer system 38 could include additional specialized components. For example, the computer system 38 could include a dedicated graphics or sound module, to provide better quality video and audio to users. However, such additions come at the price of increased power usage and may not provide a significant enough increase in performance to justify the higher power requirements. Ideally, the preferred computer system 38 will be capable of performing basic tasks such as video playback and word processing.

The communications system 42 comprises a wireless network adapter 43, a wireless display module 44, a Bluetooth module 45, a satellite transceiver 46, a cellular antenna 47, a mobile broadband module 48, and an Advanced Television Systems Committee (ATSC) receiver 49. The ATSC receiver 49 communicates with the television antenna 20 of the first ear cover 2, allowing the present invention to play certain television broadcasts picked up by the television antenna 20. Likewise, the satellite transceiver 46 communicates with the satellite antenna 20 of the second ear cover 3, allowing the present invention to send and receive information over satellite networks, enabling the use of features such as GPS. The wireless network adapter 43 allows the present invention to connect to nearby networks (generally 802.11, as well as devices connected to those networks), while the Bluetooth module 45 allows other Bluetooth enabled devices, such as some console controllers, remotes, and smart phones, to interface with the present invention. The wireless display module 44 allows the present invention to output information to a compatible external display, such as a television; this feature can be replicated using the HDMI connection if a compatible external display is not available. The cellular antenna 47 allows the present invention to operate over cell networks, while the embedded mobile broadband module 48 allows the present invention to utilize the broadband internet access provided by cellular companies, such as 3G. The mobile broadband module 48 provides a larger area of network coverage, useful if there are no proximal wireless networks. As with the computer system 38, the communications system 42 can be housed with the first ear cover 2, the second ear cover 3, or split between both. Ideally the ATSC receiver 49 will be positioned adjacent to the television antenna 20, house within the first ear cover 2. Likewise, the satellite transceiver 46 will be housed within the second ear cover 3, adjacent to the satellite antenna 20.

In other embodiments a variety of accessory devices could enhance the functionality of the present invention. One potential accessory device is a controller that can be communicably coupled to the display system 31, making games and other programs easier to use with the present invention. Potentially, a laser keyboard could be positioned on the exterior side of the display system 31 or on the first screen bar 26 or second screen bar 27. The laser keyboard would create a virtual keyboard on a flat surface, allowing a user to type with the present invention without the need to carry around a keyboard. An interior light could be positioned on the interior side of the display system 31, first screen bar 26, or second screen bar 27 and used to provide interior lighting when the present invention is in use. Additionally, an exterior light could be positioned on the exterior side of the display system 31. The exterior light would allow a user to better see their surroundings when using the present invention in low light conditions, such as during a nighttime stroll. An exterior camera system, including a front exterior camera and a rear exterior camera, could also be added. The front exterior camera would face away from the present invention, in a forward or backwards direction. The exterior cameras would then allow a user to see video footage from their front and backsides, outputting footage to the display. The front exterior camera could allow a user to continue using the present invention while mobile, navigating obstacles by viewing the feed from the front exterior camera. The exterior cameras could also be given low-light or thermal viewing capabilities, allowing the cameras to be used in a wider variety of situations. As well as providing video capabilities, the exterior cameras would function as regular cameras, being capable of taking pictures. Another possible addition is a security device to limit access to the present invention. The security device could be a thumbprint reader or utilize a more intricate method, such as retinal scans. Other possible inclusions include power indicators and temperature sensors. In general a wide variety of accessory devices can be added to enhance the utility of the present invention without interfering with the intended function.

In the future the present invention will also be able to make use of new standards and technologies as they develop. For example, cell phone communications standards have evolved from 3G, to 4G, and eventually new standards such as 5G will be introduced. Visual and audio technologies are also advancing, with the concept of 5D recently having been introduced. As these and other new technologies develop, the present invention will be able to incorporate them as well as the necessary components.

Although the invention has been explained in relation to its preferred embodiment, it is to be understood that many other possible modifications and variations can be made without departing from the spirit and scope of the invention as hereinafter claimed.

What is claimed is:

1. A headset with retinal display and integrated computing system comprises:
    a pair of ear covers comprises a first ear cover and a second ear cover;
    the first ear cover and second ear cover each comprise an enclosure, an annular screen rail, a speaker, a control interface, and a set of connection ports;
    the speaker being positioned on the enclosure opposite the control interface;
    the annular screen rail being positioned on the enclosure between the speaker and the control interface;
    the annular screen rail being positioned around the enclosure;
    the set of connection ports being positioned on the enclosure adjacent to the annular screen rail around the enclosure;
    the annular screen rail comprises a track and a guide slider;
    the guide slider being movably engaged with the track;
    a first screen bar and a second screen bar;
    the first screen bar and the second screen bar each comprise a support end and a screen end;
    the support end of the first screen bar being connected to the guide slider of the first ear cover;
    the support end of the second screen bar being connected to the guide slider of the second ear cover;
    an adjustable support band;
    a display system;
    a computer system, wherein the computer system runs an operating system;
    a communications system;
    a power source;
    the adjustable support band being connected to the enclosure of the first ear cover and the enclosure of the second ear cover;
    the first screen bar being movably engaged with the annular screen rail of the first enclosure;
    the second screen bar being movably engaged with the annular screen rail of the second enclosure;
    the screen end sleeving into the support end;
    the display system being hingedly attached to the screen end of the first screen bar;

the display system being hingedly attached to the screen end of the second screen bar;

the power source being electrically connected to the display system, the computer system and the communications system; and the computer system being electronically connected to the communications system and the screen.

2. The headset with retinal display and integrated computing system as claimed in claim 1 comprises:

the first ear cover and second ear cover each comprise an antenna;

the control interface comprises an input housing and an input device;

the antenna being rotatably connected to the enclosure adjacent to the annular screen rail;

the antenna traversing into the enclosure;

the input housing being recessed into the enclosure;

the input device being positioned in and attached to the input housing;

the speaker, antenna, and input device each being electrically connected to the power source; and the speaker, antenna, and input device each being electronically connected to the computer system.

3. The headset with retinal display and integrated computing system as claimed in claim 1 comprises:

a power button being positioned on the enclosure of the first ear cover adjacent to the input housing; and the power button being electronically connected to the computer system and the screen.

4. The headset with retinal display and integrated computing system as claimed in claim 1 comprises:

the set of connection ports being electrically connected to the power source; and the set of connection ports being electronically connected to the computer system.

5. The headset with retinal display and integrated computing system as claimed in claim 1 comprises:

the set of connection ports of the first ear cover comprises a first Universal Serial Bus (USB) input, a High-Definition Multimedia Interface (HDMI) input and an audio input; and the set of connection ports of the second ear cover comprises a second USB input, an Ethernet input, a power port, and a Secure Digital (SD) card slot.

6. The headset with retinal display and integrated computing system as claimed in claim 1 comprises:

the adjustable support band comprises a main section, a first end section, and a second end section;

the main section comprises a main rail;

the main rail laterally traversing through the main section;

the first end section being connected to the main section by the main rail;

the second end section being connected to the main section by the main rail opposite the first end section;

the first end section and the second end section each being slidably engaged with the main rail;

the first end of the adjustable support band being connected to the first ear cover; and the second end of the adjustable support band being connected to the second ear cover.

7. The headset with retinal display and integrated computing system as claimed in claim 1 comprises:

the display system comprises a first image projection device, a second image projection device, a first image refocusing device, a image refocusing device, a webcam, and a microphone;

the webcam and the microphone each being positioned between the first image projection device and the second image projection device;

the power source being electrically connected to the first image projection device, the second image projection device, the webcam and the microphone; and the computer system being electronically connected to the first image projection device, the second image projection device, the webcam and the microphone.

8. The headset with retinal display and integrated computing system as claimed in claim 7 comprises:

the first image projection device being in optical communication with the first image refocusing device, wherein the first image refocusing device overlays a first image on a user's first retina; and the second image projection device being in optical communication with the second image refocusing device, wherein the second image refocusing device overlays a second image on a user's second retina.

9. The headset with retinal display and integrated computing system as claimed in claim 1 comprises:

the display system comprises a first hinge and a second hinge;

the display system connected to the screen end of the first screen bar by the first hinge; and the display system connected to the screen end of the second screen bar by the second hinge.

10. The headset with retinal display and integrated computing system as claimed in claim 1 comprises:

the computer system comprises a chipset, a non-volatile storage, and a volatile storage, wherein the operating system is stored on the non-volatile storage; and the computer system being housed within the pair of ear covers.

11. The headset with retinal display and integrated computing system as claimed in claim 1 comprises:

the communications system comprises a wireless network adapter, a wireless display module, a Bluetooth module, a satellite transceiver, a cellular antenna, a mobile broadband module, and an Advanced Television Systems Committee (ATSC) receiver;

the communications system being housed within the pair of ear covers;

the ATSC receiver being electronically connected to the antenna of the first ear cover; and the satellite transceiver being electronically connected to the antenna of the second ear cover.

12. A headset with retinal display and integrated computing system comprises:

a pair of ear covers comprises a first ear cover and a second ear cover;

the first ear cover and second ear cover each comprise an enclosure, an annular screen rail, a speaker, a control interface, and a set of connection ports;

the speaker being positioned on the enclosure opposite the control interface;

the annular screen rail being positioned on the enclosure between the speaker and the control interface;

the annular screen rail being positioned around the enclosure;

the set of connection ports being positioned on the enclosure adjacent to the annular screen rail around the enclosure;

the annular screen rail comprises a track and a guide slider;

the guide slider being movably engaged with the track;

a first screen bar and a second screen bar;

the first screen bar and the second screen bar each comprise a support end and a screen end;
the support end of the first screen bar being connected to the guide slider of the first ear cover;
the support end of the second screen bar being connected to the guide slider of the second ear cover;
an adjustable support band;
a display system;
the display system comprises a first image projection device, a second image projection device, a first image refocusing device, a image refocusing device, a webcam, and a microphone;
a computer system, wherein the computer system runs an operating system;
a communications system;
a power source;
the adjustable support band being connected to the enclosure of the first ear cover and the enclosure of the second ear cover;
the first screen bar being movably engaged with the annular screen rail of the first enclosure;
the second screen bar being movably engaged with the annular screen rail of the second enclosure;
the screen end sleeving into the support end;
the display system being hingedly attached to the screen end of the first screen bar;
the display system being hingedly attached to the screen end of the second screen bar;
the power source being electrically connected to the display system, the computer system and the communications system;
the computer system being electronically connected to the communications system and the screen;
the set of connection ports being electrically connected to the power source; and
the set of connection ports being electronically connected to the computer system.

13. The headset with retinal display and integrated computing system as claimed in claim 12 comprises:
the first ear cover and second ear cover each comprise an antenna;
the control interface comprises an input housing and an input device;
the antenna being rotatably connected to the enclosure adjacent to the annular screen rail;
the antenna traversing into the enclosure;
the input housing being recessed into the enclosure;
the input device being positioned in and attached to the input housing;
the speaker, antenna, and input device each being electrically connected to the power source; and
the speaker, antenna, and input device each being electronically connected to the computer system.

14. The headset with retinal display and integrated computing system as claimed in claim 12 comprises:
a power button being positioned on the enclosure of the first ear cover adjacent to the input housing; and
the power button being electronically connected to the computer system and the screen.

15. The headset with retinal display and integrated computing system as claimed in claim 12 comprises:
the set of connection ports of the first ear cover comprises a first Universal Serial Bus (USB) input, a High-Definition Multimedia Interface (HDMI) input and an audio input; and
the set of connection ports of the second ear cover comprises a second USB input, an Ethernet input, a power port, and a Secure Digital (SD) card slot.

16. The headset with retinal display and integrated computing system as claimed in claim 12 comprises:
the adjustable support band comprises a main section, a first end section, and a second end section;
the main section comprises a main rail;
the main rail laterally traversing through the main section;
the first end section being connected to the main section by the main rail;
the second end section being connected to the main section by the main rail opposite the first end section;
the first end section and the second end section each being slidably engaged with the main rail;
the first end of the adjustable support band being connected to the first ear cover; and
the second end of the adjustable support band being connected to the second ear cover.

17. The headset with retinal display and integrated computing system as claimed in claim 12 comprises:
the webcam and the microphone each being positioned between the first image projection device and the second image projection device;
the power source being electrically connected to the first image projection device, the second image projection device, the webcam and the microphone;
the computer system being electronically connected to the first image projection device, the second image projection device, the webcam and the microphone;
the first image projection device being in optical communication with the first image refocusing device, wherein the first image refocusing device overlays a first image on a user's first retina; and
the second image projection device being in optical communication with the second image refocusing device, wherein the second image refocusing device overlays a second image on a user's second retina.

18. The headset with retinal display and integrated computing system as claimed in claim 12 comprises:
the display system further comprises a first hinge and a second hinge;
the display system connected to the screen end of the first screen bar by the first hinge; and
the display system connected to the screen end of the second screen bar by the second hinge.

19. The headset with retinal display and integrated computing system as claimed in claim 12 comprises:
the computer system comprises a chipset, a non-volatile storage, and a volatile storage, wherein the operating system is stored on the non-volatile storage; and
the computer system being housed within the pair of ear covers.

20. The headset with retinal display and integrated computing system as claimed in claim 12 comprises:
the communications system comprises a wireless network adapter, a wireless display module, a Bluetooth module, a satellite transceiver, a cellular antenna, a mobile broadband module, and an Advanced Television Systems Committee (ATSC) receiver;
the communications system being housed within the pair of ear covers;
the ATSC receiver being electronically connected to the antenna of the first ear cover; and
the satellite transceiver being electronically connected to the antenna of the second ear cover.

* * * * *